United States Patent
Yamauchi et al.

(10) Patent No.: US 7,395,175 B2
(45) Date of Patent: Jul. 1, 2008

(54) DIGITAL DATA RECORDING APPARATUS, SAMPLING DATA IDENTIFICATION METHOD THEREOF, AND PROGRAM FOR IDENTIFYING SAMPLING DATA

(75) Inventors: Tsuneo Yamauchi, Nagoya (JP); Iwao Fujii, Nagoya (JP); Akane Mandokoro, Nagano (JP); Masayoshi Kuroyanagi, Nagano (JP)

(73) Assignees: National University Corporation Nagoya University, Aichi-Ken (JP); Macome Corporation, Nagano (JP)

( * ) Notice: Subject to any disclaimer, the term of this patent is extended or adjusted under 35 U.S.C. 154(b) by 0 days.

(21) Appl. No.: 11/435,721

(22) Filed: May 18, 2006

(65) Prior Publication Data

US 2006/0265176 A1 Nov. 23, 2006

(30) Foreign Application Priority Data

May 19, 2005 (JP) ............................. 2005-146888

(51) Int. Cl.
*G01K 1/00* (2006.01)
*G06F 15/00* (2006.01)

(52) U.S. Cl. .................. 702/130; 73/23.4; 341/155; 702/141; 702/176

(58) Field of Classification Search ......... 702/130–132, 702/136, 141, 176, 177, 189; 341/155; 73/23.4; 713/322
See application file for complete search history.

(56) References Cited

U.S. PATENT DOCUMENTS

| 5,812,427 A | * | 9/1998 | Nonoyama et al. | 702/141 |
| 6,233,534 B1 | * | 5/2001 | Morozumi et al. | 702/176 |
| 6,307,496 B1 | * | 10/2001 | Ikuta et al. | 341/155 |
| 2006/0179918 A1 | * | 8/2006 | Liu | 73/23.4 |

FOREIGN PATENT DOCUMENTS

| JP | 55-138626 | 10/1980 |
| JP | 6-6218 | 1/1994 |
| JP | 7-159553 | 6/1995 |
| JP | 9-119992 | 5/1997 |
| JP | 10-281806 | 10/1998 |
| JP | 2002-122447 | 4/2002 |
| JP | 2004/29037 | 1/2004 |

* cited by examiner

*Primary Examiner*—John Barlow
*Assistant Examiner*—John Le
(74) *Attorney, Agent, or Firm*—Wenderoth, Lind & Ponack, L.L.P.

(57) ABSTRACT

A digital data recording apparatus, which can record the exact acquisition time of data, a sampling data identification method thereof, and a program for identifying sampling data, are provided. A CPU 11 reads out the program of a first conversion formula. The CPU 11 uses the first conversion formula to convert a time series of detection temperature data into a time series of actual oscillation frequencies f" of a reference clock signal. At a subsequent step, the CPU 11 calculates the respective normal sampling timings employing the current time as a reference time by dividing a time series of count values by each of the actual oscillation frequencies f" corresponding to the respective count values.

11 Claims, 11 Drawing Sheets

FREQUENCY FLUCTUATIONS DUE TO CHANGES IN AMBIENT TEMPERATURE, TAKING FREQUENCY AT +25°C AS REFERENCE
● TUNING FORK RESONATOR/SAW RESONATOR
APPROXIMATION FORMULA FOR FREQUENCY-TEMPERATURE CHARACTERISTICS:
$$\Delta f/f = a(\theta T - \theta X)^2$$
$\theta X$: ARBITRARY TEMPERATURE FREQUENCY FLUCTUATIONS DUE TO CHANGES IN AMBIENT TEMPERATURE,
TAKING FREQUENCY AT +25°C AS REFERENCE
● AT RESONATOR
APPROXIMATION FORMULA FOR FREQUENCY-TEMPERATURE CHARACTERISTICS:
$$\Delta f/f = \alpha(\theta X - 25) + \beta(\theta X - 25)^2 + \gamma(\theta X - 25)^3$$

AT RESONATOR

DIGITAL DATA RECORDING APPARATUS, SAMPLING DATA IDENTIFICATION METHOD THEREOF, AND PROGRAM FOR IDENTIFYING SAMPLING DATA

BACKGROUND OF THE INVENTION

1. Field of the Invention

This invention relates to a digital data recording apparatus, a sampling data identification method thereof, and a program for identifying sampling data.

2. Description of the Related Art

A seismometer for monitoring ground tremors at a certain monitoring point and an apparatus for recording earthquake motion waveforms thereof are already known. In this case, the recording apparatus receives an analog signal, which corresponds to the ground motion at the aforementioned monitoring point, from the seismometer provided at that point. In addition, the recording apparatus also generates timing data that is synchronized with sampling time obtained by dividing a reference clock signal produced by an oscillator (for example, a quartz crystal oscillator). The recording apparatus then subjects the analog signal from the sensor to A/D conversion at a timing that is synchronized with the sampling time in order to produce digital data. The recording apparatus then records this digital data together with the aforementioned sampling time. Since this recorded digital data and sampling time are, for example, used to identify the location of the hypocenter of an earthquake or to estimate the subsurface structure of locations to which seismic waves were transmitted or the like, it is necessary to know the exact sampling time at which each piece of digital data was sampled.

However, since the oscillation frequency of a reference clock signal, which defines the timing that is synchronized with the sampling time, may deviate from an oscillation frequency for generating an exact time, there is a problem that in some cases the exact sampling time can not be recorded.

Technology that attempts to solve this problem is disclosed in Japanese Laid-Open Patent No. 2004-29037 and Japanese Laid-Open Patent No. 2002-122447.

SUMMARY OF THE INVENTION

However, in the technology disclosed in the aforementioned Japanese Laid-Open Patent No. 2004-29037 and Japanese Laid-Open Patent No. 2002-122447, a Global Positioning System (GPS) signal is received from a GPS receiver for positioning. A globally common absolute time is then extracted and a reference clock signal of an oscillator is reset at timing synchronized with the absolute time. Therefore, when a deviation occurs in the oscillation frequency of the reference clock signal, the problem arises that an exact sampling time cannot be recorded unless a GPS signal is received. Although a configuration can be considered in which the GPS signal is frequently received in order to overcome this problem, the power consumption (e.g., approximately 1.5 W) of a GPS receiver is relatively high. Therefore, this cannot be considered a preferable configuration. Further, because a GPS receiver receives a GPS signal utilizing radio waves received from a geostatic satellite, a jitter is generated in the GPS signal when a radio wave delay occurs. This jitter exerts an influence when resetting the reference clock signal. As a result, there is a concern that the reference clock signal cannot be synchronized with the exact time (absolute time).

An attempt can be made to reduce the overall power consumption by only intermittently receiving a GPS signal, as in the above Japanese Laid-Open Patent No. 2004-29037. However, it is ultimately necessary to frequently receive the GPS signal since the oscillation frequency of a reference clock signal varies greatly in response to variations in the ambient temperature. Consequently, the power consumption is increased. Further, if a deviation arises in the oscillation frequency of the reference clock signal in a location that cannot receive a GPS signal, such as on the sea floor or in an underground roadway, the deviation cannot be corrected.

The present invention was completed in view of the above described circumstances. An object of this invention is to provide a digital data recording apparatus, a sampling data identification method thereof, and a program for identifying sampling data, which can record the exact acquisition time of data, even when current time information cannot be frequently received from outside or cannot be received at all.

As a device for achieving the above described object, a digital data recording apparatus according to a first aspect of this invention is a digital data recording apparatus that acquires a detection signal, which changes in response to a physical quantity, as digital data at respective sampling timings on a time base, which is based on a reference clock signal, in order to record chronological changes in that physical quantity. The digital data recording apparatus records the digital data in association with the sampling time at which the digital data was acquired. The digital data recording apparatus comprises a reference clock generating device, which generates the reference clock signal, a dividing device, which divides the reference clock signal to generate respective sampling timings on the time base, and a first counter device, which counts a clock of a reference clock signal, which is generated by the reference clock generating device, at an interval between an arbitrary reference timing on the time base and the sampling timing, which is generated by the dividing device. In addition, the digital data recording apparatus further comprises a first temperature measuring device, which measures a temperature in a vicinity of the reference clock generating device, a recording device, which stores the count value, which is counted by the first counter device, and the first detection temperature, which is measured by the first temperature measuring device at the time of the count, and a calculating device. The calculating device calculates a normal sampling time, which corrects an error caused by a temperature variation, based on the count value and the first detection temperature that are stored in the recording device. The calculating device uses a first relationship information that expresses a correlation between each first detection temperature, which can be detected by the first temperature measuring device, and each oscillation frequency of the reference clock signal.

As used herein, the term "detection signal" may refer to either an analog signal or a digital signal that changes in response to a physical quantity (for example, a displacement/deformation, a vibration, a sound wave, a change of pressure, a change in an electromagnetic wave, heat, light, et cetera).

Further, the term "reference timing" includes a time when the power of a digital data apparatus is switched on, a time when starting a measurement or a time when ending a measurement, a time when time information is input from outside (not limited to GPS reception), and a specific sampling timing and the like.

According to a second aspect, there is provided the digital data recording apparatus according to the first aspect and comprising a receiving device, which receives the current time information from outside. The arbitrary reference timing is a timing of reception of the time information signal by the receiving device. The calculating device calculates the normal sampling time as time information based on the current time information that is received by the receiving device.

According to a third aspect, there is provided the digital data recording apparatus according to the first aspect or the second aspect and comprising an A/D conversion device that receives an A/D conversion command signal in synchrony with the sampling timing and converts a signal, which is detected as an analog signal, into a digital signal. The third aspect also comprises a second temperature measuring device, which measures a temperature in a vicinity of the A/D conversion device. The recording device stores a digital value, which is obtained through the conversion of the A/D conversion device, and the second detection temperature, which is detected by the second temperature-measuring device. The calculating device calculates a normal digital value, which corrects an error due to a temperature variation, based on the digital value and the second detection temperature, which are stored in the recording device, using a second relationship information. The second relationship information expresses a correlation between each second detection temperature that can be detected by the second temperature measuring device and a reference voltage of the A/D conversion device.

According to a fourth aspect, there is provided the digital data recording apparatus according to any one of the first to third aspects, wherein the first temperature measuring device is a quartz crystal temperature sensor.

According to a fifth aspect, there is provided the digital data recording apparatus according to any one of the first to fourth aspects and comprising a measuring device, which measures a temperature in a vicinity of a power supply circuit that supplies power to a sensor that outputs the detection signal or a power supply voltage value thereof. The recording device stores the digital data, which is acquired at the sampling timing, and the measurement value of the measuring device at that time. The calculating device calculates a normal digital value, which corrects an error caused by a variation in the power supply voltage, based on the digital data and the measurement value, which are stored in the recording device, using a third relationship information. The third relationship information expresses a correlation between each measurement value, which can be measured by the measuring device, and a detection signal level from the sensor.

A digital data recording apparatus according to a sixth aspect counts a number of pulses of a detection signal in which the frequency changes in response to a physical quantity within respective sampling times on a time base that is based upon a reference clock signal. In addition, the sixth aspect acquires the frequency of the detection signal for each sampling time based on a count value thereof and the sampling time. The digital data recording apparatus comprises a reference clock generating device, which generates the reference clock signal, a dividing device, which divides the reference clock signal to generate each sampling time on the time base, and a second counter device, which counts a number of pulses of the detection signal within the sampling time. In addition, the sixth aspect of the digital data recording apparatus comprises a third temperature measuring device, which measures a temperature in a vicinity of the reference clock generating device, a recording device, which stores a count value, which is counted at the second counter device, a sampling time at which the count value is counted, and a third detection temperature, which is detected by the third temperature measuring device at a time of the count, and a calculating device. The calculating device calculates a normal frequency, which corrects an error caused by a temperature variation, based on a count value, a sampling time, and a third detection temperature, which are stored in the recording device, using a fourth relationship information. The fourth relationship information expresses a correlation between each third detection temperature, which can be detected by the third temperature-measuring device, and each oscillation frequency of the reference clock signal.

A sampling data identification method according to a seventh aspect identifies the normal sampling time at which a detection signal is acquired in an apparatus. The apparatus acquires a detection signal, which varies in response to a physical quantity, as digital data at respective sampling timings, which are generated by dividing a reference clock signal. The method comprises the steps of: counting a clock of a reference clock signal in the interval between an arbitrary reference timing on a time base, which is based on the reference clock signal, and each of the sampling timings; measuring a temperature in a vicinity of the reference clock generating device, which generates a reference clock signal; and based on a first detection temperature and a count value that are obtained as a result thereof, calculating a normal sampling time, which corrects an error caused by a temperature variation, by using a first relationship information. The first relationship information expresses a correlation between each first detection temperature and each oscillation frequency of the reference clock signal.

According to an eighth aspect, the sampling data identification method according to the seventh aspect is provided and comprises the steps of: converting a detection signal as an analog signal into the digital data with an A/D conversion device at the sampling timing; measuring a temperature in a vicinity of the A/D conversion device; and based on the second detection temperature and a digital value obtained as a result thereof, calculating a normal digital value, which corrects an error caused by a temperature variation, by using a second relationship information. The second relationship information expresses a correlation between each second detection temperature and a reference voltage of the A/D conversion device.

According to a ninth aspect, the sampling data identification method according to the seventh or eighth aspect is provided and comprises the steps of: acquiring the detection signal as digital data at the sampling timing; measuring a temperature in a vicinity of a power supply circuit, which supplies power to a sensor that outputs the detection signal or a power supply voltage value thereof; and based on the measurement value and a digital value obtained as a result thereof, calculating a normal digital value, which corrects an error caused by a fluctuation in the power supply voltage, by using a third relationship information. The third relationship information expresses a correlation between each measurement value and a detection signal level from the sensor.

A sampling data identification method according to a tenth aspect counts a number of pulses of a detection signal in which a frequency varies in response to a physical quantity within respective sampling times, which are generated by dividing a reference clock signal, to identify a frequency of the detection signal at each sampling time based on a count value thereof and the sampling time. The method comprises the steps of: counting a number of pulses of the detection signal within the sampling time; measuring a temperature in a vicinity of a reference clock generating device, which generates the reference clock signal; and, based on the count value, the third detection temperature, and a sampling time for that count time, which are obtained as a result thereof, calculating a normal frequency, which corrects an error caused by a temperature variation, by using a fourth relationship information. The fourth relationship information shows a correlation between each third detection temperature and each oscillation frequency of the reference clock signal.

A program for identifying sampling data according to an eleventh aspect is a program for causing a computer of a digital data recording apparatus, which acquires a detection signal that changes in response to a physical quantity as digital data at respective sampling timings, which are generated by dividing a reference clock signal, to identify the normal sampling time at which the detection signal is acquired. The program causes the computer to execute the following: count value acquisition processing, which acquires a count value, which counts a clock of a reference clock signal that is generated by the reference clock generating device, in an interval between an arbitrary reference timing, on a time base that is based on the reference clock signal, and each of the sampling timings; first temperature measurement processing, which acquires a first detection temperature during the count processing based on a temperature detection signal from the first temperature measuring device, which measures the temperature in a vicinity of the reference clock generating device; storage processing, which stores the count value and the first detection temperature in a memory; and calculation processing, which reads out a first relationship information, previously recorded in a memory, that shows a correlation between each first detection temperature, which can be detected by the first temperature measuring device, and each oscillation frequency of the reference clock signal. The calculation processing then calculates a normal sampling time, which corrects an error caused by a temperature variation, based on the stored first detection temperature and the count value.

According to a twelfth aspect, there is provided the program for identifying sampling data according to the eleventh aspect and that causes the computer to execute digital value acquisition processing, which acquires a digital value obtained by converting a signal detected as an analog signal into the digital data with A/D conversion device at the sampling timing, and second temperature measurement processing, which acquires a second detection temperature at the sampling timing based on a temperature detection signal from a second temperature measuring device that measures a temperature in a vicinity of the A/D conversion device. The storage processing includes processing that also stores the digital value and the second detection temperature in a memory. In addition, the calculation processing includes processing that reads out a second relationship information, previously recorded in a memory, expressing a correlation between each second detection temperature and a reference voltage of the A/D conversion device. The calculation processing calculates a normal digital value, which corrects an error caused by a temperature variation, based on the stored digital value and the second detection temperature.

According to a thirteenth aspect, there is provided the program for identifying sampling data according to the eleventh or twelfth aspect and that causes the computer to execute measurement value acquisition processing, which acquires a measurement value at the sampling timing based on a measurement signal from a measuring device, which measures a temperature in a vicinity of a power supply circuit that supplies power to a sensor that outputs the detection signal, or a power supply voltage value thereof. The storage processing includes processing that stores in a memory the digital data that is acquired at the sampling timing and the measurement value at the measuring device at that time. The calculation processing includes processing that reads out a third relationship information, previously recorded in a memory, expressing a correlation between each measurement value and a detection signal level from the sensor. The calculation processing calculates a normal digital value, which corrects an error caused by a variation in the power supply voltage, based on the stored measurement value and digital data.

A program for identifying sampling data according to a fourteenth aspect is a program for causing a computer of a digital data recording apparatus, which counts a number of pulses of a detection signal in which a frequency changes in response to a physical quantity within respective sampling timings, which are generated by dividing a reference clock signal, and acquires a frequency of the detection signal at each sampling time based on a count value and the sampling time, to identify an acquired normal frequency thereof. The computer comprises the following: a second counter device, which counts a number of pulses of the detection signal within the sampling time; a third temperature measuring device, which measures a temperature in a vicinity of the reference clock generating device; a recording device, which stores the count value that is counted by the second counter device, the sampling time at which the count value is counted, and the third detection temperature that is detected by the third temperature measuring device at the count time; and a calculating device. The calculating device calculates a normal frequency, which corrects an error caused by a temperature variation, based on the count value, the sampling time, and the third detection temperature, which are stored in the recording device, using a fourth relationship information. The fourth relationship information expresses a correlation between each third detection temperature, which can be detected by the third temperature-measuring device, and each oscillation frequency of the reference clock signal.

<Invention According to the First, Seventh, and Eleventh Aspects>

The oscillation frequency of a reference clock signal as a reference for a time base greatly fluctuates in response to variations in the ambient temperature of the oscillator that generates the oscillation frequency. The relationship between the oscillation frequency and the ambient temperature can be understood as a relational expression or a correspondence table based on experimental results, oscillator standards, or the like. The invention of the present application was devised by focusing on the fact that the oscillation frequency of a reference clock signal varies in response to temperature variations.

More specifically, according to the present configuration for example, a first relationship information, which expresses the correlation between each first detection temperature in the vicinity of a reference clock generating device and each oscillation frequency of a reference clock signal, is previously prepared. Next, the clock of a reference clock signal is counted in an interval between respective sampling timings, which are generated by dividing the reference clock signal, and an arbitrary reference timing. At the same time, a first detection temperature (in the vicinity of the reference clock generating device) is detected in that interval. The count value and the first detection temperature that are thereby obtained are stored.

Subsequently, the actual oscillation frequency of the reference clock generating device at the time of counting the above described count value can be known on the basis of the first detection temperature and the above described first relationship information. Thus, the deviation with respect to a normal oscillation frequency for generating a normal sampling time can be known. Accordingly, it is possible to adjust the time base so as to take into account the deviation between the actual oscillation frequency and a normal oscillation frequency. It is also possible to calculate a normal sampling time, taking as a reference the arbitrary reference timing based on the above described count value.

This configuration makes it possible to calculate the normal sampling time by correcting for irregular variations in the time base, after the fact, based on fluctuations in the oscillation frequency of the reference clock signal that were understood by measuring the temperature variations. For example, the normal sampling time can be calculated without frequently receiving the exact time information or the like from outside, and without performing a correction that uses a hardware circuit configuration, such as the resetting of the reference clock signal of an oscillator.

<Invention According to the Second Aspect>

According to this configuration the reliability of the corrected time base can be enhanced by receiving the current time information from outside. The present configuration is a configuration that calculates a normal sampling time by software processing. This is different to the previously described conventional configuration, which resets the reference clock signal by using a hardware circuit configuration. Accordingly, even when receiving current time information from outside (e.g., such as receiving GPS signals), it is possible to avoid the influence of jitters caused by a radio wave delays by performing calculation processing that averages the reception data that is received over a plurality of times.

<Invention According to the Third, Eighth, and Twelfth Aspects>

Since the reference voltage (i.e., dynamic range) of an A/D converter also fluctuates due to the ambient temperature of the A/D converter, an error with respect to a normal digital value occurs in the digital value obtained by the A/D conversion of a detection signal. In regard to this fluctuation, the aforementioned Japanese Laid-Open Patent No. 2004-29037 and Japanese Laid-Open Patent No. 2002-122447 do not teach, suggest, or describe, any matters concerning this point.

The relationship between this reference voltage and the ambient temperature can also be understood as a relational expression, a correspondence table based on experimental results, or oscillator standards or the like. Thus, according to the present configuration, a second relationship information, expressing a correlation between each second detection temperature (in the vicinity of the A/D converter) and a reference voltage of the A/D conversion device, is previously prepared. The digital value, obtained by subjecting a detection signal to A/D conversion, and the second detection temperature detected at that time, are stored.

Subsequently, the actual reference voltage level at the time of the A/D conversion can be known depending on the second detection temperature and the second relationship information, based on which a deviation with respect to the normal reference voltage level for obtaining a normal digital value can be known. Accordingly, the digital value can be corrected to a normal digital value by taking into account the deviation between the actual reference voltage and the normal reference voltage. Further, even for a measurement performed inside an underground mine or on the sea floor, for which the current time information cannot be readily received from the outside, an A/D conversion result can be accurately obtained at a timing that is synchronized to global time.

<Invention According to Fourth Aspect>

By using a quartz crystal temperature sensor as a temperature measuring device, power consumption can be reduced in comparison with a case of using a different temperature measuring device such as, for example, a thermistor. In addition, using a quartz crystal temperature sensor also results in favorable measurement accuracy.

<Invention According to the Fifth, Ninth, and Thirteenth Aspects>

This configuration eliminates the influence of fluctuations in the power supply voltage, which accompany temperature variations in the vicinity of a power supply circuit. When the temperature changes in the vicinity of a power supply circuit, which supplies power to a sensor that outputs a detection signal, the detection signal level from the sensor also varies under that influence. Therefore, an error with respect to the normal digital value occurs in a digital value based on the detection signal.

The relationship between the temperature in the vicinity of the power supply circuit or the power supply voltage value thereof and the detection signal level can also be understood as a relational expression or a correspondence table based on experimental results, sensor standards, or the like. As a result, according to this configuration a third relationship information, expressing the correlation between a temperature in the vicinity of the power supply circuit or the power supply voltage value thereof and a detection signal level, is previously prepared. In addition, the measurement value and the digital value, which are acquired at a sampling timing, are stored.

Subsequently, the deviation with respect to a normal value for the detection signal level can be known from the measurement value and the third relationship information. In addition, the digital value can be corrected to a normal digital value by taking into account this deviation.

<Invention According to the Sixth, Tenth, and Fourteenth Aspects>

A reference clock signal (as a reference for a sampling time) fluctuates in response to the temperature in the vicinity of a reference clock generating device. Accordingly, since the sampling time fluctuates in response to variations in the temperature, an error with respect to a normal frequency will occur in a frequency that is calculated based upon the sampling time. Therefore, according to the present configuration a fourth relationship information, expressing a correlation between the temperature in the vicinity of a reference clock generating device and the oscillation frequency of a reference clock signal, is previously prepared. In addition, the sampling time, a third detection temperature, and count value within that time, are stored.

Subsequently, a normal sampling time can be determined based upon the third detection temperature and the fourth relationship information. This enables the determination of the exact count value within the normal sampling time. As a result, the normal frequency can be calculated.

DETAILED DESCRIPTION OF THE PREFERRED EMBODIMENTS

Embodiment 1

Embodiment 1 of the present invention will now be described with reference to FIGS. 1 to 4. A digital data recording apparatus 10 according to this embodiment is, for example, an apparatus for receiving from a seismometer (not shown), which is disposed at a monitoring point, an analog signal S1 (see (a) in FIG. 2). The analog signal S1 is generated in response to ground motion at the monitoring point. The analog signal S1 is then subjected to sequential A/D conversion at sampling timing. In addition, the signal is recorded as digital data together with the sampling time.

1. Hardware Configuration

Figure 1:
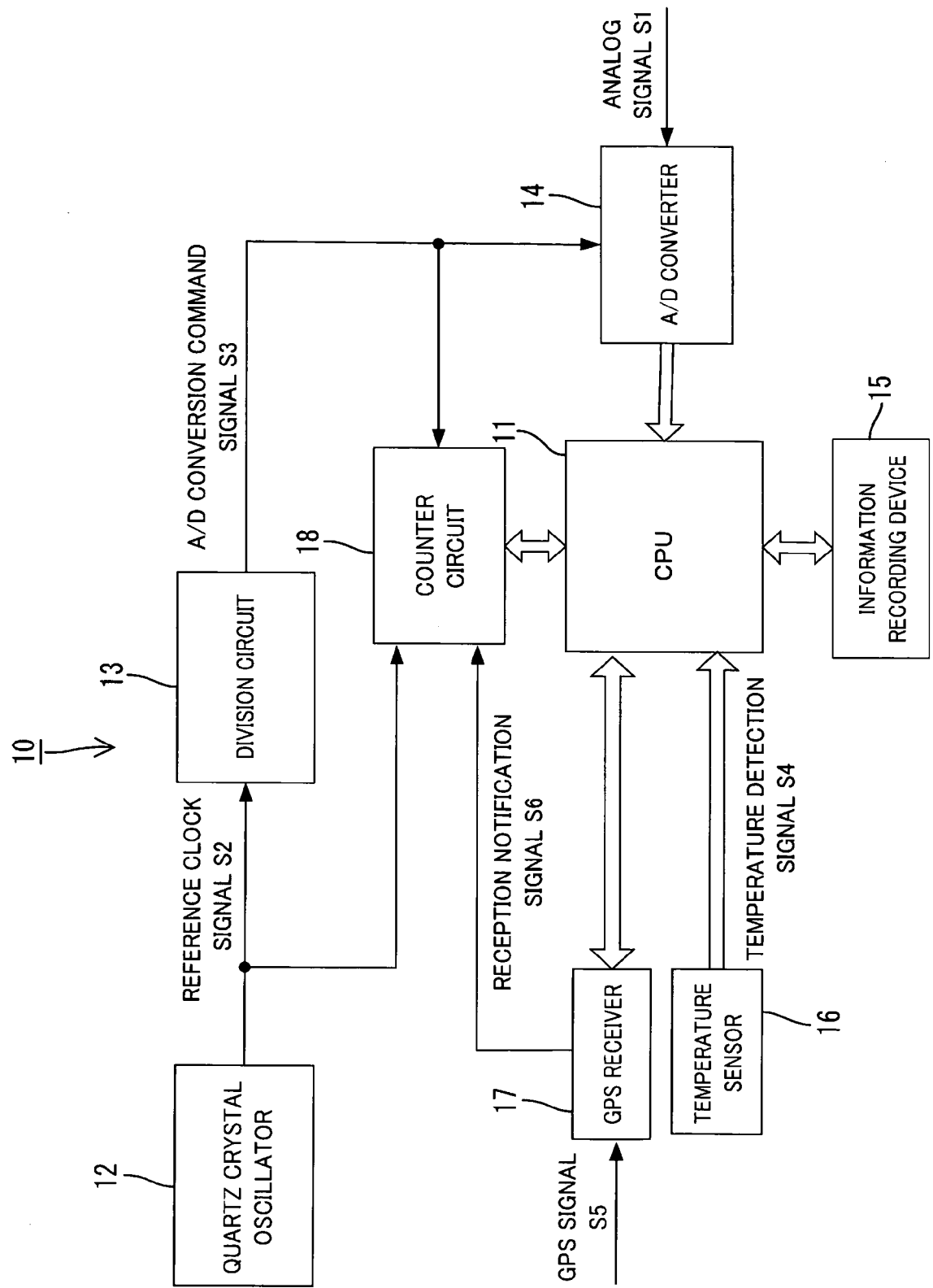
FIG. 1 is a hardware configuration diagram of a digital data recording apparatus according to one embodiment of the present invention.

FIG. 1 is a hardware configuration diagram of the digital data recording apparatus 10 according to this embodiment. The digital data recording apparatus 10 comprises a data logger circuit that is composed of a CPU (central processing unit) 11, a quartz crystal oscillator 12, a clock division circuit 13, an A/D converter 14, and an information-recording device 15 (memory). The digital data recording apparatus 10 also includes a temperature sensor 16, a counter circuit 18, and a GPS receiver 17, in addition to the data logger circuit.

(1) Data Logger Circuit

Figure 2:
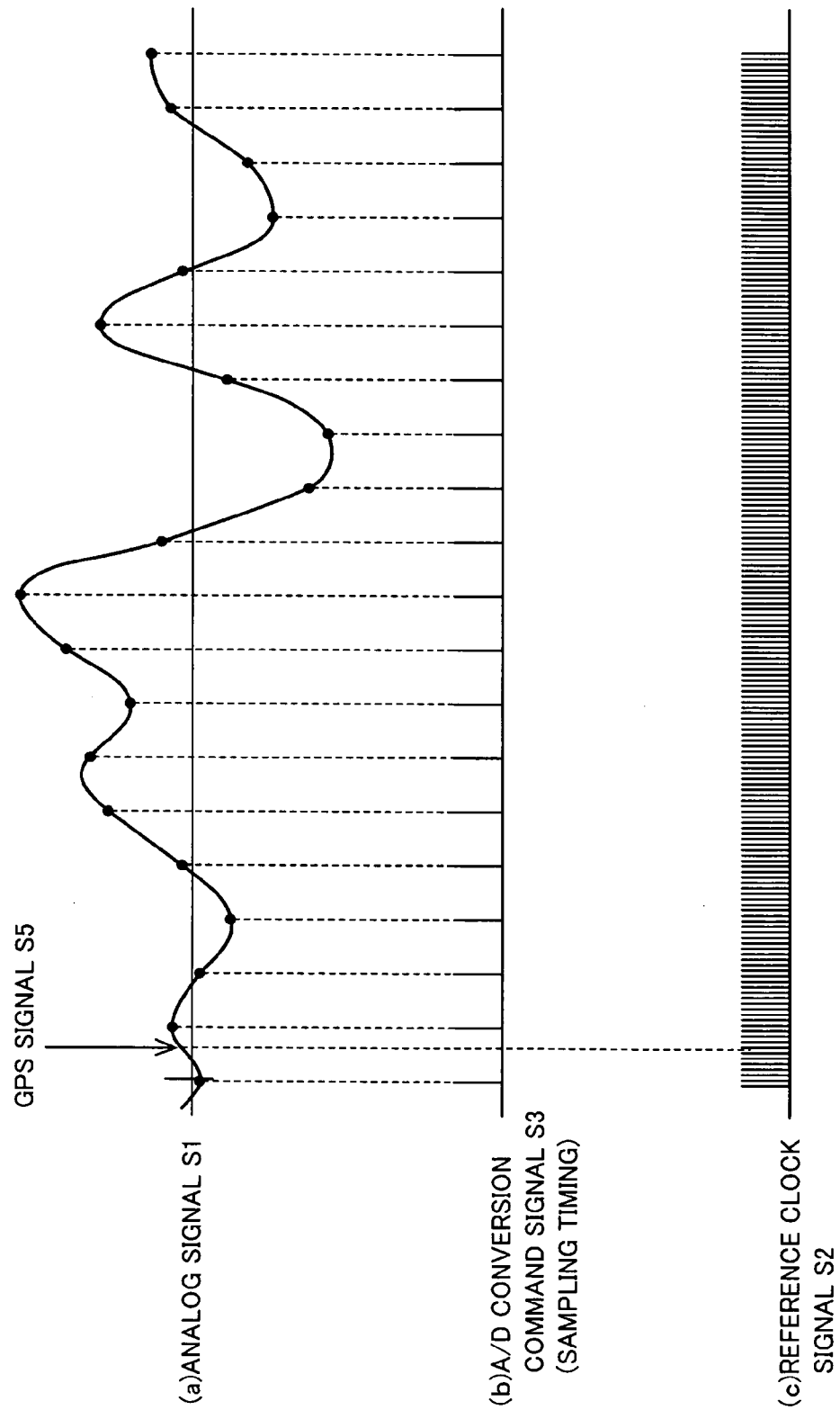
FIG. 2 is a view showing a time chart of an analog signal, an A/D conversion command signal and a reference clock signal.

The construction of the data logger circuit will be described first. As shown by FIG. 2 (c), the quartz crystal oscillator 12 generates a reference clock signal S2 as a reference for a time base within the data logger circuit. The clock division circuit 13 divides the reference clock signal S2 in order to generate the sampling timing (see (b) in FIG. 2), and imparts an A/D conversion command signal S3 to the A/D converter 14 at this sampling timing. Since the reference clock signal S2 (from the quartz crystal oscillator 12) is a high frequency clock signal, the clock division circuit 13 fulfills a role of dividing the reference clock signal S2 into a frequency that is more suited for the conversion speed of the A/D converter 14. In this embodiment, when the oscillation frequency of the reference clock signal S2 (from the quartz crystal oscillator 12) is, for example, 100 KHz, this frequency is divided (e.g., with a division ratio: 1/1000) by the clock division circuit 13 so as to generate a sampling timing of 100 Hz.

According to this configuration, the A/D conversion command signal S3 from the clock division circuit 13 and an analog signal S1 from the above described sensor are supplied to the A/D converter 14. Upon receiving the A/D conversion command signal S3 at the sampling timing generated by the clock division circuit 13, the A/D converter 14 subjects the analog signal S1 to A/D conversion. The analog signal is then outputted as a digital signal. The CPU 11 receives the digital signal and, for example, records it in a predetermined first recording area of the information-recording device 15 as digital data relating to the size of an earthquake motion.

The information recording device 15 can read or record various kinds of data or programs of the CPU 11 from or to recording media such as, but not limited to, for example, a hard disk, a floppy disk (registered trademark), a magneto-optical disk (MO), flash memory, or a CD-ROM. Further, a program for identifying the sampling time and digital data according to this embodiment is recorded on a predetermined second recording area of the information-recording device 15. Introducing this program into the CPU 11 causes the CPU 11 to execute calculation processing, as described later.

(2) Circuit Elements Other than the Data Logger Circuit

In this embodiment, the temperature sensor 16 has, for example, a temperature detecting element such as a thermistor, which outputs a temperature detection signal S4 as an electrical signal in accordance with a detection temperature. The temperature detection signal S4 from the temperature sensor 16 is subjected to A/D conversion by an A/D converter not shown and is then supplied to the CPU 11. On the actual circuit, the temperature sensor 16 is disposed in the vicinity of the quartz crystal oscillator 12 and the A/D converter 14 in order to measure the ambient temperature around these components.

The GPS receiver 17 is a device that receives a GPS (Global Positioning System) signal S5, and extracts a globally common absolute time and a clock pulse, which is in synchrony with the absolute time, from the GPS signal S5. The GPS receiver 17, for example, receives the GPS signal S5 upon reception of a control signal from the CPU 11, and supplies a reception notification signal S6 to the counter circuit 18 at the reception timing. In addition to this, the GPS receiver 17 supplies the current time data or the like, which was extracted from the GPS signal S5, to the CPU 11. The CPU 11 writes this data in the first recording area of the information-recording device 15. According to this embodiment, for example, the GPS receiver 17 first performs reception of the GPS signal S5 at the startup time of the data logger circuit. Thereafter, reception of the GPS signal S5 is performed at an appropriate timing interval.

The counter circuit 18 counts the clock of a reference clock signal S2 from the quartz crystal oscillator 12. The A/D conversion command signal S3 from the clock division circuit 13 and the reception notification signal S5 from the GPS receiver 17 are input thereto. More specifically, the counter circuit 18 initiates an operation to count the number of clocks of the reference clock signal S2 at the input timing of the reception notification signal S6 from the GPS receiver 17. Thereafter, when an A/D conversion command signal S3 is input from the clock division circuit 13, the counter circuit 18 latches the count value at that time and supplies the value to the CPU 11. When a plurality of GPS signals S5 are input, the counter circuit 18 latches the count values in response to the A/D conversion command signals S3 that correspond thereto, and supplies the values in sequence to the CPU 11. Further, the CPU 11, for example, reads a temperature detection signal S4 from the temperature sensor 16 at timings that are synchronized with each sampling timing to thereby acquire detection temperature data.

As a result, a count value, digital data, and detection temperature data, to be supplied to the CPU 11 at each sampling timing, are sequentially recorded in chronological order in the first recording area of the information recording device 15, while remaining associated with each other.

2. Method for Identifying the Normal Sampling Time and Normal Digital Data, and the Calculation Processing Thereof by CPU 11

The present embodiment performs correction to obtain a "normal sampling time" and "normal digital data" by an after-the-fact calculation processing by the CPU 11. The calculation processing is based on a time-series data group comprising a count value, digital data, and detection temperature data, which were previously recorded in the first recording area. Although in this embodiment (FIG. 1) recording to the information recording device 15 is performed by using the CPU 11, a configuration may be adopted in which each data is written to the information recording device 15 with a sequential circuit, without using the CPU 11. The data is then readout with a different CPU 11 in order to perform calculation processing.

(1) Identification of a "Normal Sampling Time"

If an oscillation frequency of a reference clock signal S2 from the quartz crystal oscillator 12 is an assumed frequency f', which is assumed to be able to generate a sampling timing that is in synchrony with the clock pulse of an absolute time, a "normal sampling time", which acquired each piece of digital data that was actually obtained by subjecting the analog signal S1 to an A/D conversion, can be determined from the assumed frequency f' and each count value described above.

However, in fact the oscillation frequency of the reference clock signal S2 deviates from the above described assumed frequency f' due mainly to variations in the ambient temperature surrounding the quartz crystal oscillator 12. Since a sampling timing (i.e., the output timing of the A/D conversion command signal S3) that is generated by dividing the oscillation frequency also deviates as a result, it is not possible to identify the "normal sampling time" at which each piece of digital data was actually acquired without performing some kind of correction.

Therefore, according to this embodiment, the deviation of the quartz crystal oscillator 12 as a reference clock generating device is corrected using a temperature measured in the vicinity of the quartz crystal oscillator 12. This is because it is considered that the deviations in the oscillation frequency of the quartz resonator (which comprises the quartz crystal oscillator 12 used for the reference clock) are mostly caused by ambient temperature variations. To obtain a stable oscillation frequency output, the quartz crystal oscillator 12 is normally inserted into a thermostatic bath in order to maintain a constant temperature around the quartz resonator. However, the power consumption of the data logger circuit increases substantially when a thermostatic bath is used. Therefore, if the frequency-temperature characteristics of the quartz resonator of the quartz crystal oscillator 12 can be known or determined, then by detecting the variation in the ambient temperature of the quartz crystal oscillator 12 it is possible to determine the deviation amount of the oscillation frequency accompanying the temperature variation. The deviation amount of the sampling timing can then be estimated based on the deviation amount of the oscillation frequency.

Figure 3A:
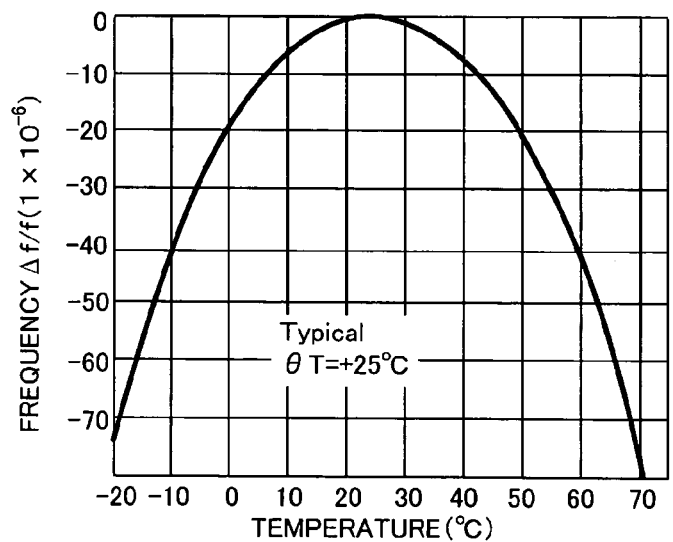
FIG. 3A and FIG. 3B are graphs showing frequency-temperature characteristics of an intermediate-frequency quartz crystal resonator.
Figure 3B:
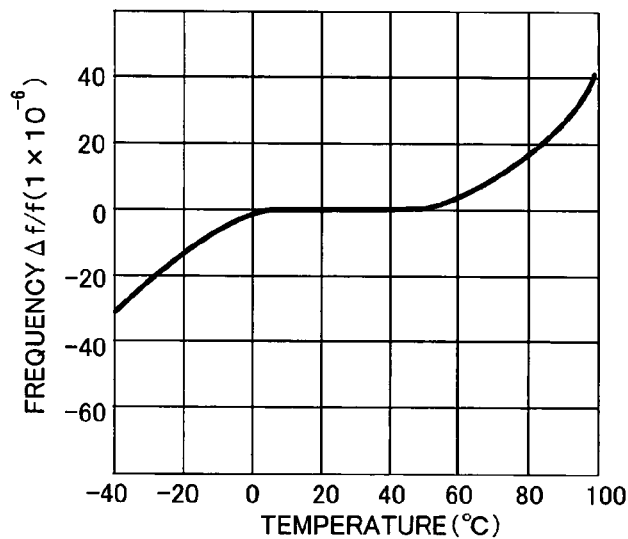

More specifically, the quartz crystal oscillator 12 used for this embodiment uses a tuning fork resonator, which exhibits the frequency-temperature characteristics shown in FIG. 3A, or an AT resonator, which exhibits the frequency-temperature characteristics shown in FIG. 3B. The frequency-temperature characteristics of these resonators can be determined experimentally. In addition, the characteristics may also be described in a product catalogue of an intermediate-frequency quartz crystal resonator.

For example, in the case of the tuning fork resonator, the following temperature dependences can be understood from the frequency-temperature characteristics curve shown in FIG. 3A:

(a) The oscillation frequency peak is at 25° C.±5° C.

(b) The temperature coefficient a =−0.04 ppm/° $C.^2$.

It is tentatively assumed that the quartz crystal oscillator 12 generates a reference clock signal S2 of the previously described assumed frequency f' (for example, 100 KHz) at an ambient temperature of 25° C. Hereafter, an ambient temperature of 25° C. at this time is referred to as the reference temperature. In this case, for example, when the ambient temperature is changed from 25° C. to 10° C., it is possible to calculate the frequency variation $\Delta f$ of the reference clock signal S2 caused by the temperature change using the following first conversion formula (i.e., first relationship information):

Frequency variation $\Delta f$ of reference clock signal
$S2=f'\times a$, where, temperature coefficient a=−k/(reference temperature−detection temperature)$^2$.

In this case (k=−0.04 ppm), the oscillation frequency of the reference clock signal S2 is delayed by 17.8×10$^{-6}$. In other words, the oscillation frequency of the reference clock signal S2 lengthens by 17.8 μsec. Consequently, since it is possible to know the deviation amount of an actual oscillation frequency f", which was changed by ambient temperature variation with respect to an assumed frequency f', the time base, which is based on the assumed frequency f', can be corrected (or converted) to a time base that is based on the actual frequency f" by taking into account the deviation amount. The normal sampling time can then be identified based upon this corrected time base.

(2) Identification of "Normal Digital Data"

The A/D converter 14 is, for example, a successive approximation 16-bit A/D converter. Since the reference voltage also changes in response to the ambient temperature, thereby changing the dynamic range, normal digital data cannot be obtained. However, if the reference voltage-ambient temperature characteristics can be previously known, it is possible to correct the data to normal digital data based upon the temperature characteristics by detecting the ambient temperature when acquiring digital data.

If it is tentatively assumed that a normal digital value can be obtained at an assumed reference voltage level V' (for example, 2.5V) when the ambient temperature is 25° C. (reference temperature), the recorded digital value can be converted (corrected) to a normal digital value based upon the following second conversion formula (i.e., second relationship information):

Normal digital value=recorded digital value×(V'/V"), where,

V'/V": fluctuation rate of reference voltage caused by temperature variation

V": reference voltage after a temperature variation(=V'×h (detection temperature−reference temperature))

h: fluctuation amount of the reference voltage per unit of temperature.

(3) Calculation Processing by the CPU

Figure 4:
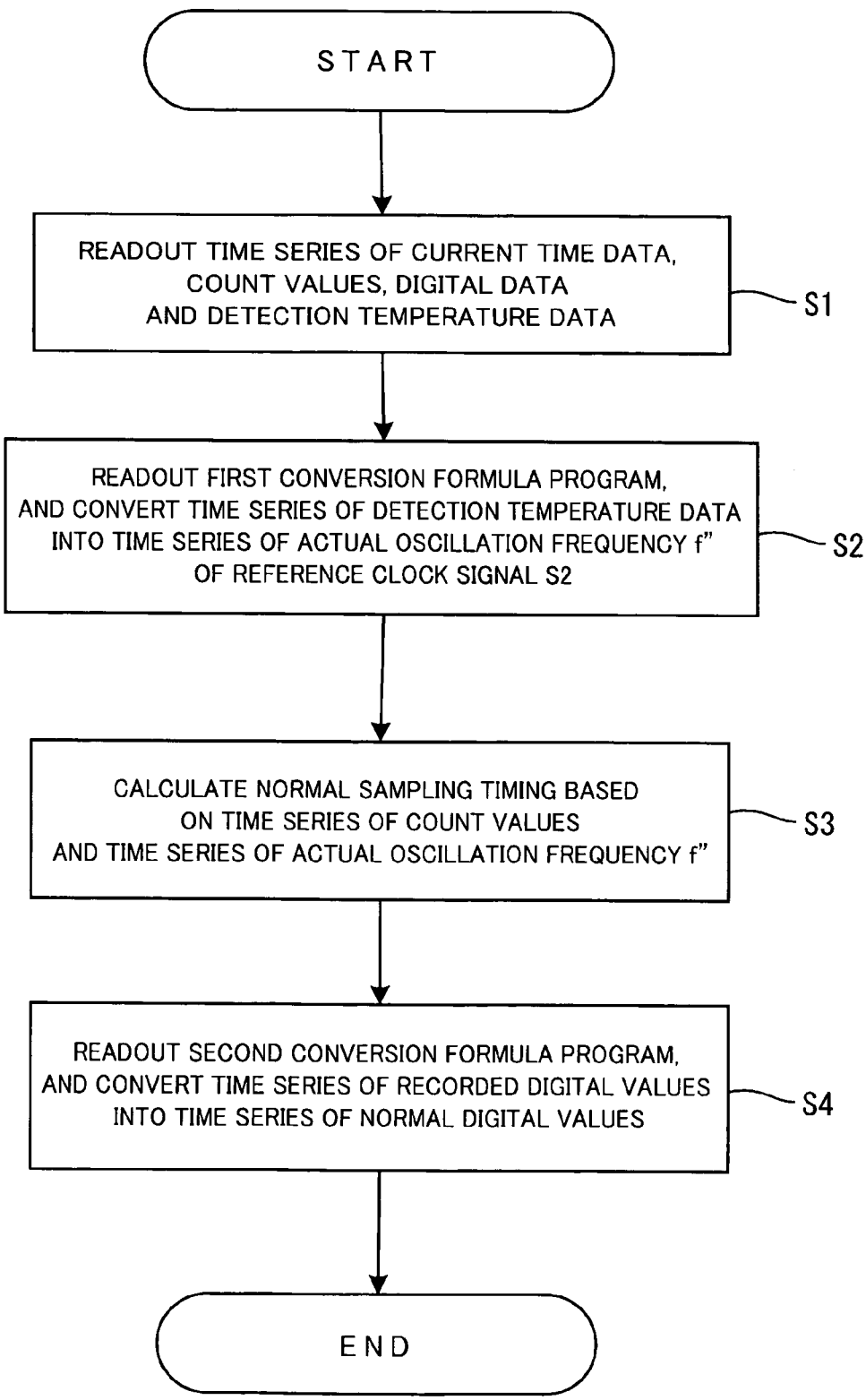
FIG. 4 is a flowchart illustrating the calculation processing that is executed by a CPU according to an embodiment of the present invention.

The specific calculation processing by the CPU 11 will be described next with reference to FIG. 4. Upon execution of the calculation processing, in step S1 the CPU 11 initially reads out a time series of the current time data, count values, digital data, and detection temperature data, which are recorded in the first recording area. Further, in a third recording area of the information-recording device 15, programs are recorded for executing calculation processing according to the previously described first and second conversion formulas. In step S2, the CPU 11 reads out the program for the first conversion formula and converts the time series of the detection temperature data into the actual oscillation frequency f" of the reference clock signal S2, using the first conversion formula. Next, in step S3, by dividing the time series of the count values by each actual oscillation frequency f", which correspond to the respective count values, the respective normal sampling timings can then be calculated, taking the current time as a reference time.

In step S4, the CPU 11 reads out the program of the second conversion formula next. The CPU 11 uses the second conversion formula and the time series of the detection temperature data and converts the time series of digital values read out from the third recording area into a time series of normal digital values.

3. Effects of this Embodiment

As described in the foregoing, according to this embodiment the ambient temperature of the quartz crystal oscillator 12 and the A/D converter 14 is detected during sampling. By using this ambient temperature with the first and second conversion formula, it is possible to obtain a normal sampling time and a normal digital value that takes into account a deviation amount of the reference clock signal S2 and the reference voltage. Furthermore, by performing a GPS reception at least once during the period from the start of measurement to the completion of measurement, it is possible to calculate a normal sampling time that establishes the time at that point as a reference time, without the necessity of frequently performing GPS receptions.

Further, since the GPS reception timing is detected at a clock timing of the reference clock signal S2 that is faster than an A/D conversion timing interval (i.e. sampling timing interval), it is possible to capture a GPS reception timing that is more exact than the A/D conversion timing interval (sampling timing interval).

Further, by correcting a frequency fluctuation caused by a temperature variation in an oscillator for a reference clock using the temperature information measured in the vicinity of the oscillator, it is possible to identify an almost exact sampling time.

Embodiment 2

Figure 5:
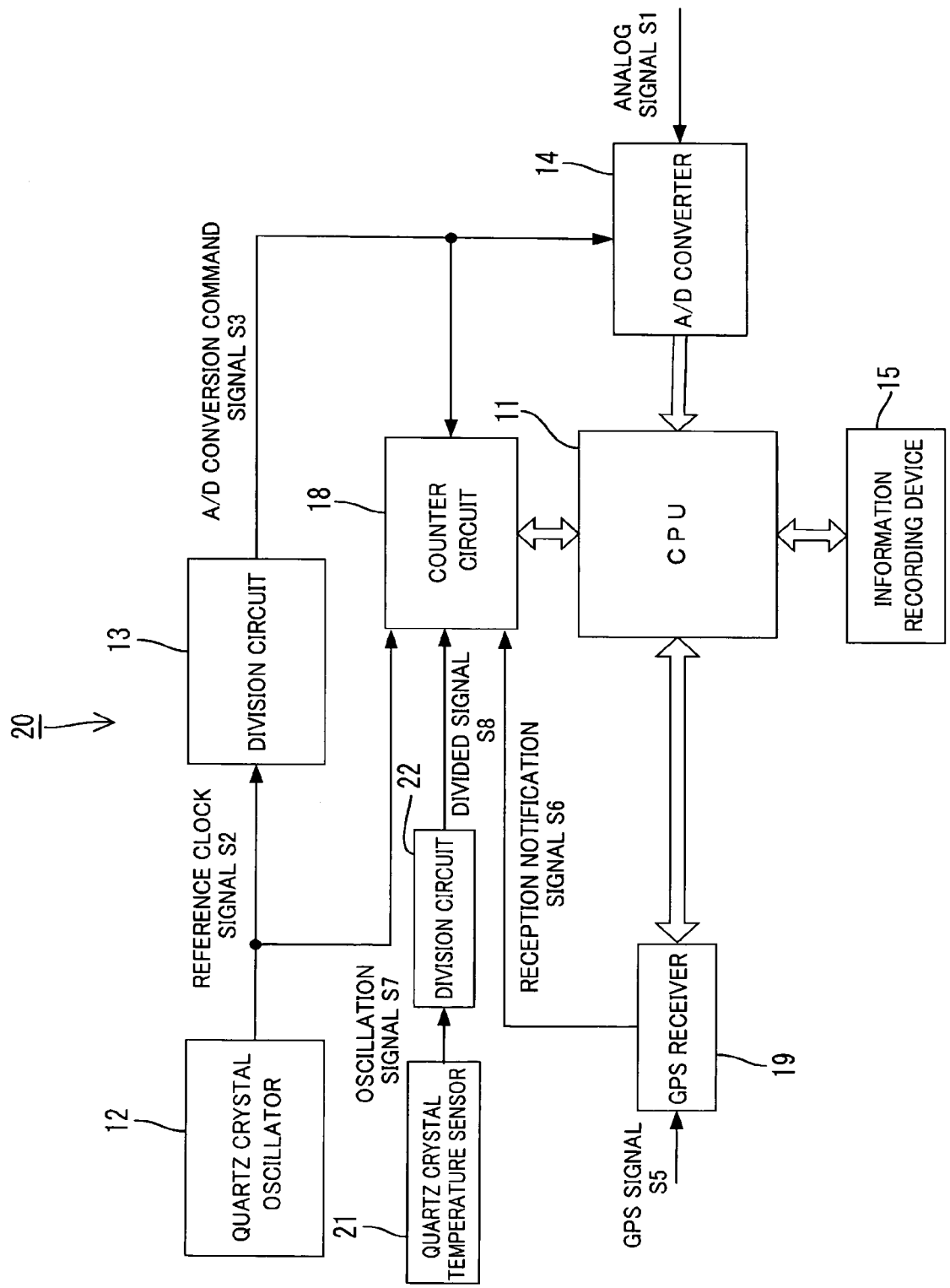
FIG. 5 is a hardware configuration diagram of a digital data recording apparatus according to another embodiment of the present invention.
Figure 6:
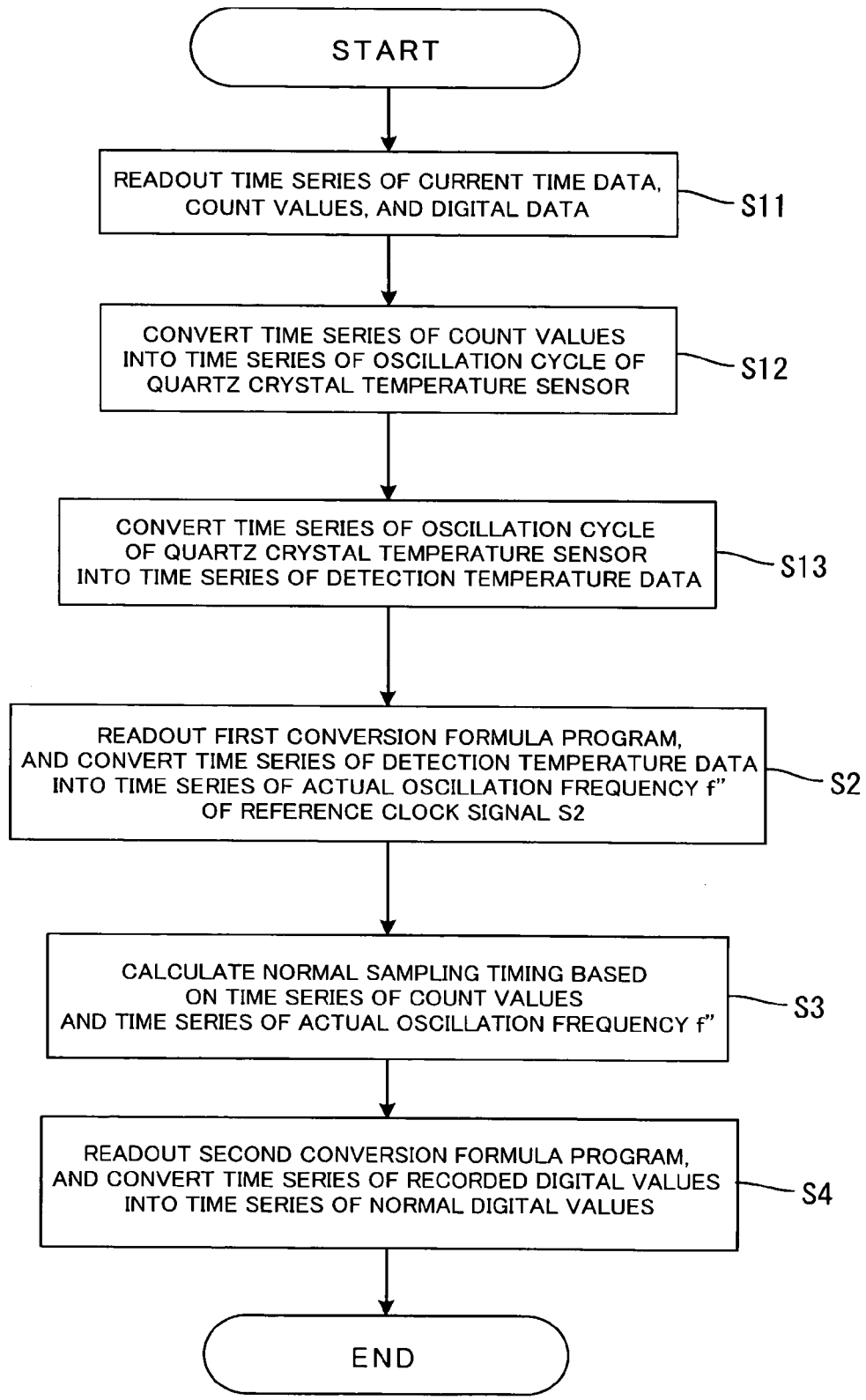
FIG. 6 is a flowchart illustrating the calculation processing that is executed by a CPU according to another embodiment of the present invention.
Figure 7:
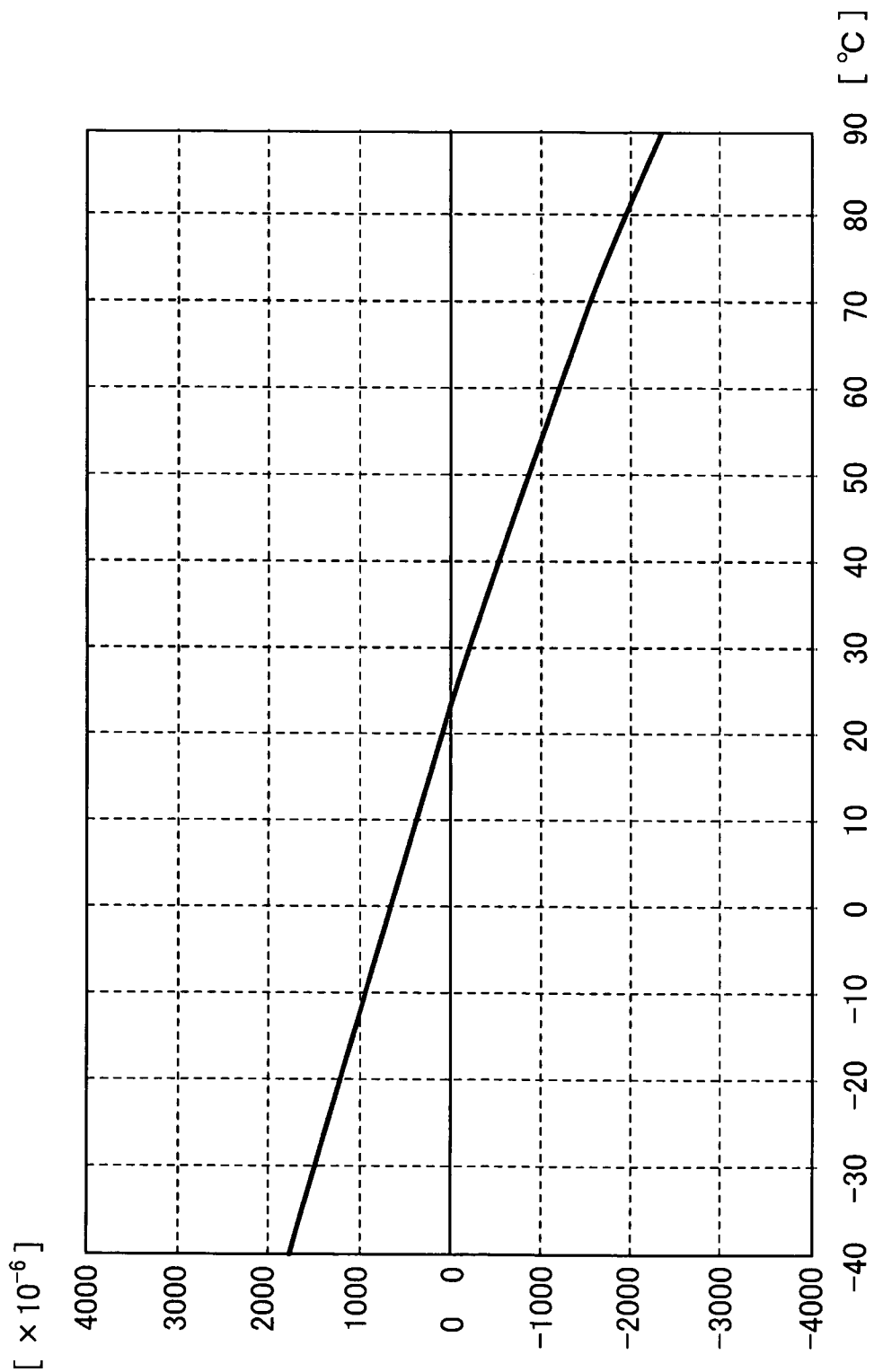
FIG. 7 is a graph showing one example of frequency-temperature characteristics of a quartz crystal temperature sensor.

FIGS. 5 to 7 illustrate Embodiment 2. A difference between this embodiment and Embodiment 1 is the temperature detection method. The other features are the same as Embodiment 1. Accordingly, the symbols used hereunder are the same as Embodiment 1, duplicate descriptions are omitted, and only the differences with respect to Embodiment 1 are described.

As shown in FIG. 5, a digital data recording apparatus 20 according to this embodiment utilizes a quartz crystal temperature sensor 21 instead of the previously described temperature sensor 16. More specifically, the quartz crystal temperature sensor 21 is composed of a quartz resonator for which the temperature dependency of the oscillation frequency is extremely high. FIG. 7 shows the frequency-temperature characteristics of HTS-206 manufactured by Seiko Epson Corporation as one example thereof. The temperature coefficient at an ordinary temperature is approximately −30 ppm/° C. The quartz crystal temperature sensor 21 outputs an oscillation signal S7 of an oscillation frequency in accordance with the ambient temperature. On the actual circuit, this quartz crystal temperature sensor 21 is disposed in the vicinity of the quartz crystal oscillator 12 and the A/D converter 14 in order to measure the ambient temperature around these components.

A clock division circuit 22 supplies a divided signal S8 to the counter circuit 18 that is obtained by dividing the oscillation signal S7 from the quartz crystal temperature sensor 21. That is, the counter circuit 18 receives the clock of the divided signal S8 at a cycle that is in accordance with the oscillation frequency (i.e., ambient temperature) of the quartz crystal temperature sensor 21.

The counter circuit 18 is a device that counts the clock of the reference clock signal S2 from the quartz crystal oscillator 12. Further, as described above, the counter circuit 18 receives the A/D conversion command signal S3 from the clock division circuit 13, the clock of the divided signal S8 from the clock division circuit 22, and the reception notification signal S6 from the GPS receiver 17. More specifically, input switching is selectively performed for the counter circuit 18 through the control of a switching device (not shown) by the CPU 11 so that normally, while the divided signal S8 is input thereto at a cycle in accordance with the oscillation frequency of the quartz crystal temperature sensor 21, at the time of the GPS signal reception the reception notification signal S6 thereof can be input thereto.

Upon input of the above described clock of the divided signal S8 or the reception notification signal S6, the counter circuit 18 starts to count the number of clocks of the reference clock signal S2. Then, when an A/D conversion command signal S3 is input at the next sampling timing, the counter circuit 18 latches the count value at that time. The CPU 11 records this latched count value in the first recording area of the information recording device 15 in association with the digital data obtained by the A/D conversion at the aforementioned sampling timing.

By repeating this operation, count values and digital data are sequentially recorded in a time series in the first recording area.

Thereafter, upon execution of calculation processing, as shown in FIG. 6, in S11 the CPU 11 first reads out the time series of current time data, count values, and digital data, which are recorded in the first recording area. In S12, the CPU 11 determines the time series of the oscillation cycle of the quartz crystal temperature sensor 21 from the time series of the count values. The temperature coefficient of the quartz crystal temperature sensor 21 produced for temperature measurement is larger than the temperature coefficient of the quartz crystal oscillator 14, which used a tuning fork-type quartz resonator. The quartz crystal temperature sensor 21 has a temperature coefficient of approximately −30 ppm/° C. at ordinary temperatures. As a result, an almost exact oscillation cycle can also be determined by means of the number of clocks of the reference clock signal S2 that varies in response to temperature variations. In S13, the CPU 11 reads out a relational expression or correspondence table of frequency-temperature characteristics of the quartz crystal temperature sensor 21 that is recorded, for example, in a third recording area. The CPU 11 converts the time series of this oscillation cycle into a time series of detection temperature data. It is thereby possible to calculate the time series of detection temperatures that were detected by the quartz crystal temperature sensor 21 at each sampling timing. The processing thereafter is the same as that described in S2 to S4 of Embodiment 1. The same symbols are also used for FIG. 6 and a description of the processing is omitted.

The same effects as the previously described Embodiment 1 can be obtained with this configuration. In addition, the power consumption can be reduced through the use of the quartz crystal temperature sensor 21.

Embodiment 3

Figure 8:
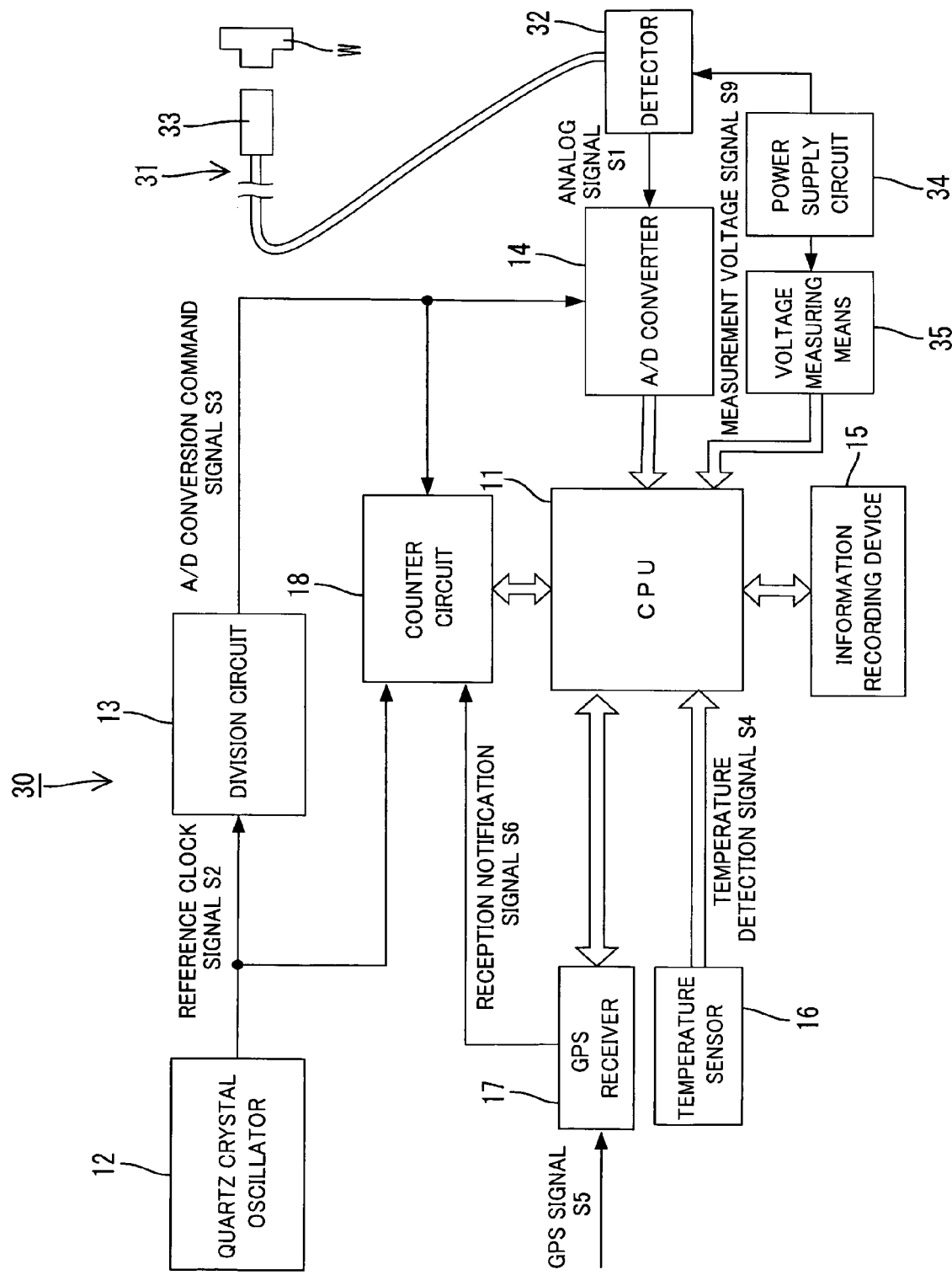
FIG. 8 is a hardware configuration diagram of a digital data recording apparatus according to still another embodiment of the present invention.
Figure 9:
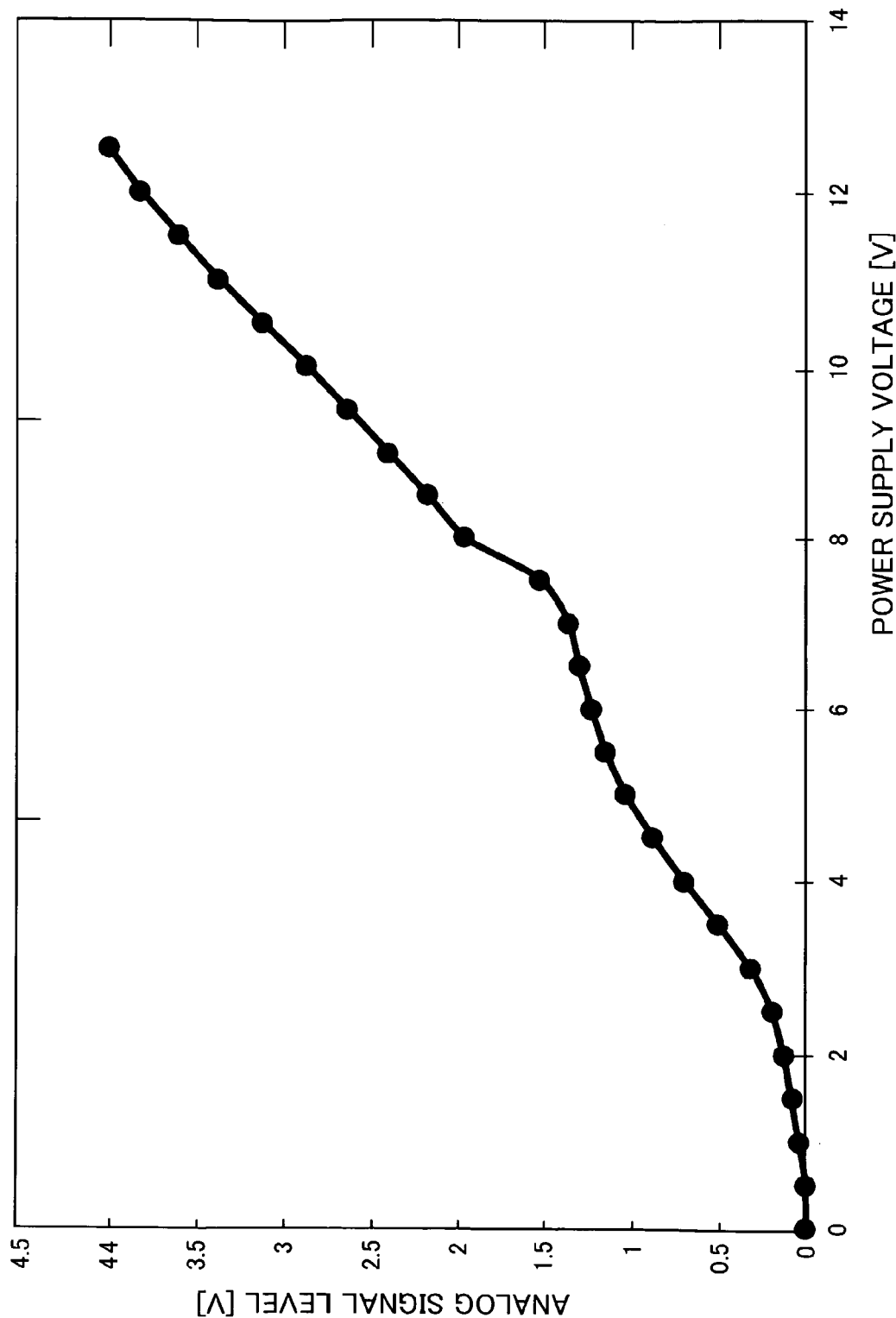
FIG. 9 is a graph showing the relationship between the voltage applied to a detector and the output voltage.

FIGS. 8 and 9 illustrate Embodiment 3. A difference between this embodiment and Embodiment 1 is the temperature detection method. The other features are the same as in Embodiment 1. Accordingly, the symbols used hereunder are the same as in Embodiment 1. Duplicate descriptions are omitted, and only the differences with respect to Embodiment 1 are described.

A digital data recording apparatus 30 of this embodiment is an apparatus that can also eliminate the effects caused by fluctuations in the power supply voltage accompanying temperature variations in the vicinity of a power supply circuit supplying power to a sensor. More specifically, the previously described analog signal S1 is a signal that is output from a magnetic sensor 31 used for detecting a magnetic object W. The magnetic sensor 31 is a discrete head-type magnetic sensor comprising a detector 32 and a detecting head 33, which is provided at the tip of a signal wire connected to the detector 32. The detecting head 33 is disposed in the direction of a detection region. An analog signal S1 of a level, which is in accordance with the location deviation between the detection object W (magnetic object) and the detecting head 33, is output from the detector 32. The detector 32 is driven by a power supply from a power supply circuit 34. The digital data recording apparatus 30 comprises a voltage-measuring device 35, which measures the power supply voltage of the power supply circuit 34. Measurement voltage signals S9 thereof are read-in in sequence by the CPU 11 at the previously described sampling timings and are recorded in the first recording area of the information-recording device 15.

The power supply voltage of the power supply circuit 34 fluctuates due to temperature variations in the vicinity of the power supply circuit 34. As a result, the level of the analog signal S1 output from the detector 32 also fluctuates. Therefore, even if a digital value is corrected on the basis of the ambient temperature variations in the quartz crystal oscillator 12 and the A/D converter 14, there is a possibility that it will not be possible to obtain a normal digital value that is in accordance with a location deviation between the detecting head 33 and the detection object W.

Thus, according to this embodiment, for example as shown in FIG. 9, the relationship between fluctuations in the power supply voltage of the power supply circuit 34 and fluctuations in the level of the analog signal S1 from the detector 32 can be experimentally determined. Based upon this relationship graph, the rate of fluctuation in the level of the analog signal S1 in response to fluctuations in the power supply voltage for an assumed power supply voltage can be known. Accordingly, for example, a relational expression or correspondence table (e.g., third relationship information) showing a correlation between the power supply voltage fluctuations and the rate of fluctuation in the level of the analog signal S1 can be created based upon this relationship graph and previously recorded in the third recording area of the information recording device 15. Then, prior to or after the processing of S4 shown in FIG. 4, the CPU 11 reads out power supply voltage information corresponding to the digital value that is being currently processed from the first recording area. By multiplying the rate of fluctuation in the level of the analog signal S1 corresponding thereto by the previously described digital value, it is possible to obtain a normal digital value from which the effects of power supply voltage fluctuations were eliminated.

Embodiment 4

Figure 10:
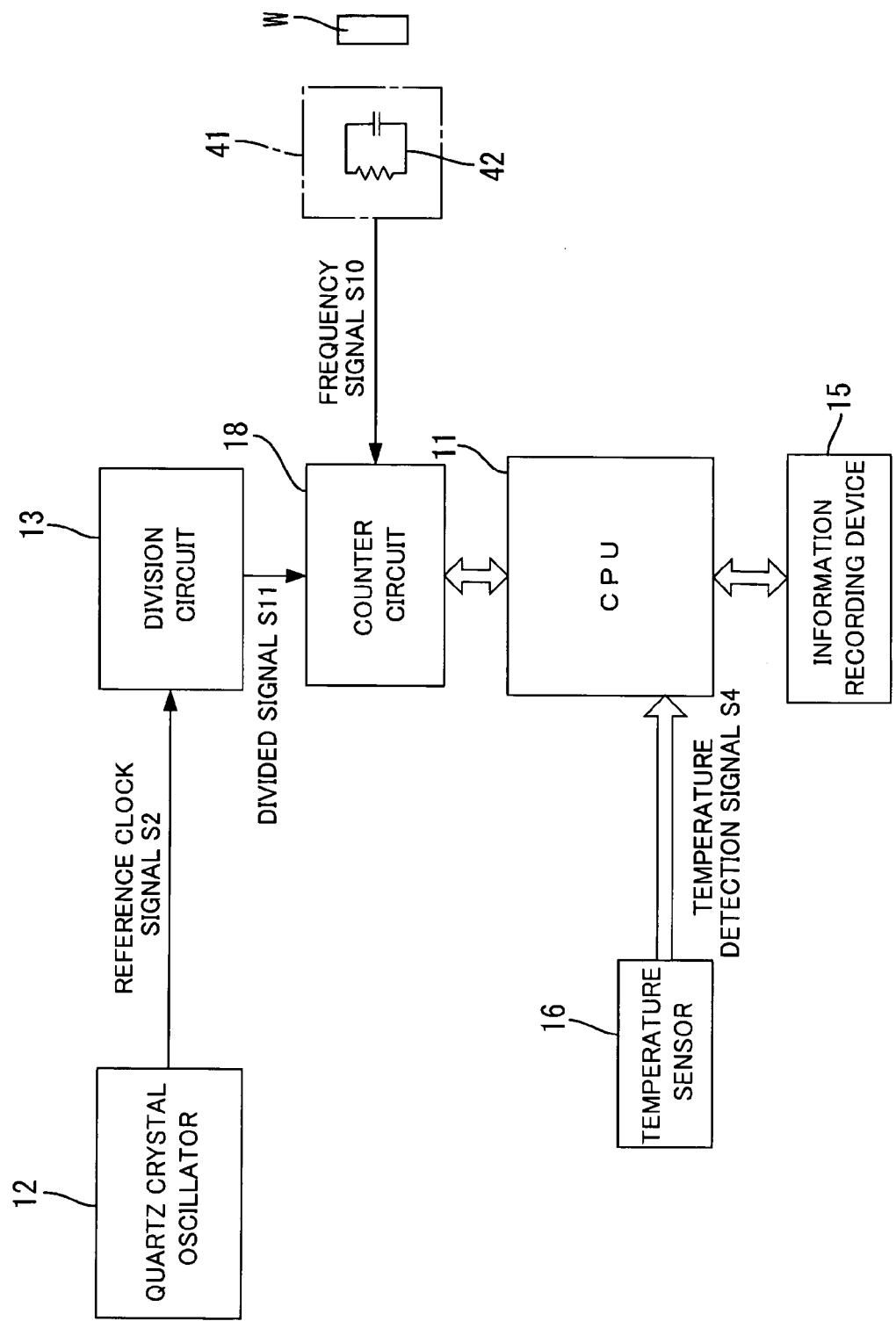
FIG. 10 is a hardware configuration diagram of a digital data recording apparatus according to yet another embodiment of the present invention.

FIG. 10 illustrates Embodiment 4. A difference between this embodiment and Embodiment 1 is the temperature detection method. The other features are the same as in Embodiment 1. Accordingly, the symbols used hereunder are the same as in Embodiment 1. Duplicate descriptions are omitted, and only the differences with respect to Embodiment 1 are described.

A digital data recording apparatus 40 of this embodiment counts the number of pulses of a frequency signal S10 (detection signal) from a variable capacity-type displacement sensor 41 within a previously assumed gate time (sampling time), and divides that count value by the aforementioned gate time to calculate the frequency. The capacity variation-type displacement sensor 41 has an RC parallel circuit 42 and outputs a frequency signal S10 of a frequency in accordance with the displacement amount of a detection object W'. The counter circuit 18, for example, counts in increments of one at each trailing edge of the frequency signal The clock division circuit 13 divides a reference clock signal S2 to supply a divided signal S11, which is synchronized with the sampling timing, to the counter circuit 18. The counter circuit 18 sequentially supplies a count value to the CPU 11 for the number of pulses of the above frequency signal S10 in the sampling times between the respective sampling timings, based on the divided signal S11. Further, the CPU 11 reads in a temperature detection signal S4 from the temperature sensor 16 at each sampling timing. This detection temperature data is recorded in the first recording area in association with the above described count values.

In this situation, the CPU 11 determines a deviation amount of the frequency of the reference clock signal S2 with respect to an assumed frequency f' at an ambient temperature of 25° C. based on the detection temperature data and the first conversion formula (fourth relationship information) of the previously described Embodiment 1. Based upon this deviation amount, the CPU 11 corrects the sampling time between each sampling timing, for which a count value was received from the counter circuit 18, to a normal sampling time. Consequently, by dividing the normal count value (i.e., the number of pulses of the frequency signal S10) within the normal sampling time after correction by the normal sampling time, the normal frequency can be calculated that corresponds to the displacement amount of the detection object W'.

Further, similarly to the previously described Embodiment 1, each normal sampling timing (sampling time) can also be calculated and corrected.

OTHER EMBODIMENTS

The present invention is not limited to the embodiments described by the foregoing description and drawings. For example, the following embodiments are also included within the technical scope of the present invention. Various modifications other than those described hereunder can also be made without departing from the scope and spirit of the present invention.

(1) Although in the above Embodiment 1, the counter circuit 18 is configured to start counting at the reception timing of the GPS receiver 17 and to latch a count value at each input timing of the A/D conversion command signal S3, the invention is not limited thereto. The counter circuit 18 may be configured to start a count operation at each input timing (each sampling timing) of the A/D conversion command signal S3 and to latch a count value at the reception timing of the GPS receiver 17. A normal sampling time can be calculated based on this count value.

(2) Although in each of the above described embodiments a single temperature sensor 16 or the like was employed as a first and a second temperature measuring device, this invention is not limited thereto. A configuration may be adopted in which dedicated temperature sensors are provided for the quartz crystal oscillator 12 and the A/D converter 14.

(3) Although in the foregoing embodiments a first and a second conversion formula was employed as a first and a second relationship information, the invention is not limited thereto. As long as there is surplus storage capacity, the respective correlation table information may be employed as the relationship information.

(4) Embodiment 2 is not limited to a configuration that counts a reference clock from the time of the input of a GPS signal or a signal from a quartz crystal temperature sensor until the next A/D conversion timing. The configuration may be one that counts a reference clock from an A/D conversion timing until the input of a GPS signal or a signal from a quartz crystal temperature sensor.

(5) Each of the above described conversion formulas may, for example, be formulas derived from an approximated curve of a plot of experimental results.

(6) Although in each of the above described embodiments, the calculation processing to correct a sampling time, a digital value, and the like, is performed in parallel with the sampling processing for a detection signal, the invention is not limited thereto. A configuration may be adopted whereby sampling data, prior to calculation processing, is temporarily recorded in the information-recording device 15. This data may be sent to a computer at a remote location through a communication line in order to perform calculation processing at that computer. A configuration may also be adopted in which sampling data recorded on the information recording device 15 is recorded on a recording medium such as a memory chip. A computer at a remote location may then read the sampling data within the recording medium in order to perform calculation processing.

(7) The above Embodiment 3 is configured to also eliminate the influence of power supply voltage fluctuations that accompany temperature variations in the vicinity of a power supply circuit that supplies power to a sensor, based on the relationship between fluctuations in the power supply voltage of the power supply circuit 34 and variations in the level of the analog signal S1 from the detector 32. However, since a correlation exists between fluctuations in the power supply voltage of the power supply circuit 34 and the ambient temperature, the configuration may be one which also eliminates the influence of power supply voltage fluctuations, which accompany temperature variations in the vicinity of the power supply circuit supplying power to the sensor, based upon the relationship between changes in the ambient temperature in the vicinity of the power supply circuit 34 and variations in the level of the analog signal S1 from the detector 32.

What is claimed is:

1. A digital data recording apparatus that records chronological changes in a physical quantity by acquiring a detection signal, which changes in response to the physical quantity, as digital data at respective sampling timings on a time base, which is based on a reference clock signal, and records the digital data in association with a sampling time at which the digital data was acquired, the digital data recording apparatus comprising:
   a reference clock generating device, which generates the reference clock signal;
   a dividing device, which divides the reference clock signal to generate the respective sampling timings on the time base;
   a first counter device, which counts a clock of the reference clock signal that is generated by the reference clock generating device in an interval between an arbitrary reference timing on the time base, and a sampling timing that is generated by the dividing device;
   a first temperature measuring device, which measures a first detection temperature proximate to the reference clock generating device;
   a recording device, which stores a count value, which is counted by the first counter device, and the first detection temperature, which is detected by the first temperature measuring device at a time of the count; and
   a calculating device;
   wherein the calculating device calculates a normal sampling time based upon the count value and the first detection temperature stored in the recording device, using a first relationship information that expresses a correlation between the first detection temperature and an oscillation frequency of the reference clock signal.

2. The digital data recording apparatus according to claim 1, further comprising:
   a receiving device, which receives a current time information from a time information signal;
   wherein the arbitrary reference timing is a timing of a reception of the time information signal by the receiving device; and
   wherein the calculating device calculates the normal sampling time as time information based upon the current time information that is received by the receiving device.

3. The digital data recording apparatus according to claim 1, further comprising:
   an A/D conversion device, which receives an A/D conversion command signal in synchrony with the sampling timing and converts the detection signal that is originally detected as an analog signal into a digital signal; and
   a second temperature measuring device, which measures a temperature proximate to the A/D conversion device;
   wherein the recording device stores a digital value of the digital signal, which is converted by the A/D conversion device, and a second detection temperature, which is measured by the second temperature measuring device at that time; and
   wherein the calculating device calculates a normal digital value based upon the digital value and the second detection temperature that are stored in the recording device, using a second relationship information.

4. The digital data recording apparatus according to claim 1, wherein the first temperature measuring device is a quartz crystal temperature sensor.

5. The digital data recording apparatus according to claim 1, further comprising:
   a measuring device, which measures a temperature proximate to a power supply circuit that supplies power to a sensor that outputs the detection signal or a power supply voltage value thereof; wherein:
   the recording device stores the digital data that is acquired at the sampling timing and a measurement value of the measuring device at that time; and the calculating device calculates a normal digital value based on digital data and a measurement value that are stored in the recording device, using a third relationship information.

6. A sampling data identification method that identifies a normal sampling time at which a detection signal is acquired in an apparatus that acquires the detection signal, which varies in response to a physical quantity, as digital data at respective sampling timings that are generated by dividing a reference clock signal, comprising the steps of:

counting a clock of the reference clock signal in an interval between an arbitrary reference timing on a time base that is based on the reference clock signal and each of the sampling timings to produce a count value;

measuring a temperature in a vicinity of a reference clock generating device that generates the reference clock signal to produce a first detection temperature;

calculating the normal sampling time based on the count value and the first detection temperature by using a first relationship information that expresses a correlation between the first detection temperature and an oscillation frequency of the reference clock signal; and outputting the calculated normal sampling time.

7. The sampling data identification method according to claim 6, further comprising the steps of:

converting a detection signal as an analog signal into the digital data with A/D conversion device at the sampling timing to produce a digital value at a respective sampling time;

measuring a temperature in a vicinity of the A/D conversion device at the sampling timing to produce a second detection temperature at the respective sampling time; and calculating a normal digital value based upon the digital value and the second detection temperature at the respective sampling time by using a second relationship information.

8. The sampling data identification method according to claim 6, further comprising the steps of:

acquiring the detection signal as digital data at the sampling timing to produce a digital value at a respective sampling time;

measuring a temperature proximate to a power supply circuit that supplies power to a sensor that outputs the detection signal or a power supply voltage value thereof to produce a measurement value at the respective sampling time; and calculating a normal digital value based upon the digital value and the measurement value at the respective sampling time by using a third relationship information.

9. A computer-readable program stored on a computer-readable medium for identifying sampling data for causing a computer of a digital data recording apparatus that acquires a detection signal, which varies in response to a physical quantity, as digital data at respective sampling timings, which are generated by dividing a reference clock signal, to identify a normal sampling time at which the detection signal is acquired, wherein the program causes the computer to execute:

count value acquisition processing, which acquires a count value that counts a clock of a reference clock signal that is generated by a reference clock generating device in an interval between an arbitrary reference timing on a time base, which is based upon the reference clock signal and each of the sampling timings;

first temperature measurement processing, which acquires a first detection temperature during the count processing based upon a temperature detection signal from a first temperature measuring device, which measures the first detection temperature proximate to the reference clock generating device;

storage processing that stores the count value and the first detection temperature in a memory;

calculation processing that reads out a first relationship information and calculates a normal sampling time based on the first detection temperature and the count value that are stored, the first relationship information expressing a correlation between the first detection temperature and an oscillation frequency of the reference clock signal; and output processing that outputs the calculated normal sampling time.

10. The computer-readable program for identifying sampling data according claim 9, which causes the computer to further execute:

digital value acquisition processing, which acquires a digital value obtained by converting a detection signal as an analog signal into the digital data with an A/D conversion device at the sampling timing; and second temperature measurement processing, which acquires a second detection temperature at the sampling timing based upon a temperature detection signal from a second temperature measuring device that measures the second detection temperature proximate to the A/D conversion device;

wherein, the storage processing further includes processing that also stores the digital value and the second detection temperature in a memory; and the calculation processing further includes processing that reads out a second relationship information and calculates the normal digital value based on a digital value and a second detection temperature that are stored.

11. The computer-readable program for identifying sampling data according to claim 9, that causes the computer to further execute:

measurement value acquisition processing, which acquires a measurement value at the sampling timing based on a measurement signal from a measuring device that measures a temperature proximate to a power supply circuit that supplies power to a sensor that outputs the detection signal, or a power supply voltage value thereof;

wherein the storage processing further includes processing that stores in a memory a digital data that is acquired at the sampling timing and a measurement value from the measuring device at that time; and the calculation processing further includes processing that reads out a third relationship information and calculates a normal digital value based on the measurement value and the digital data that are stored.

* * * * *